US012609802B2

(12) United States Patent
Gou et al.

(10) Patent No.: US 12,609,802 B2
(45) Date of Patent: Apr. 21, 2026

(54) DYNAMIC SIGNALING OF FEEDBACK MODES

(71) Applicant: ZTE Corporation, Shenzhen (CN)

(72) Inventors: Wei Gou, Shenzhen (CN); Peng Hao, Shenzhen (CN); Xing Liu, Shenzhen (CN); Xingguang Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 421 days.

(21) Appl. No.: 18/322,119

(22) Filed: May 23, 2023

(65) Prior Publication Data

US 2023/0299929 A1 Sep. 21, 2023

Related U.S. Application Data

(63) Continuation of application No. PCT/CN2021/071494, filed on Jan. 13, 2021.

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ... H04L 5/0055; H04L 1/1812; H04L 1/1829; H04L 5/0053; H04L 2001/0093; H04L 1/1896; H04L 1/1825; Y02D 30/70; H04B 7/063
See application file for complete search history.

(56) References Cited

U.S. PATENT DOCUMENTS

| | | | | |
|---|---|---|---|---|
| 2019/0349046 A1* | 11/2019 | Liu | | H04B 7/063 |
| 2021/0250905 A1* | 8/2021 | Liu | | H04L 5/0055 |
| 2023/0413260 A1* | 12/2023 | Lei | | H04L 1/1825 |

FOREIGN PATENT DOCUMENTS

| | | | | |
|---|---|---|---|---|
| CN | 101877627 | 11/2010 | | |
| CN | 103929225 | 7/2014 | | |
| CN | 104168602 | 11/2014 | | |
| CN | 106685493 | 5/2017 | | |
| EP | 3582421 | 12/2019 | | |
| WO | WO-2022087620 A1 * | 4/2022 | .......... | H04L 1/1861 |

OTHER PUBLICATIONS

Extended European Search Report for Co-Pending EP Appl. No. 21918263.1, filed Jan. 13, 2021, Report dated Oct. 13, 2023, 9 pages.
Huawei, "FL summary on improving reliability for MBS for RRC_ CONNECTED UEs" 3GPP TSG RAN WG1 Meeting #103-e R1-2009464, E-meeting, Oct. 26-Nov. 13, 2020, 25 pages.
Vivo "Discussion on mechanisms to improve reliability for RRC_ CONNECTED UEs" 3GPP TSG RAN WG1 #103-e, e-Meeting, Oct. 26-Nov. 13, 2020, R1-2007692, 5 pages.

(Continued)

*Primary Examiner* — Vinncelas Louis
(74) *Attorney, Agent, or Firm* — Perkins Coie LLP

(57) ABSTRACT

Methods, apparatus, and systems that enable dynamic signaling of various feedback modes are disclosed. In one example aspect, a method for wireless communication includes transmitting, by a base station, a message to a terminal device configuring the terminal device to operate in a feedback mode and performing a transmission with the terminal device according to the feedback mode.

14 Claims, 9 Drawing Sheets

200 transmitting, by a base station, a message to a terminal device configuring the terminal device to operate in a feedback mode
210 performing a transmission with the terminal device according to the feedback mode
220

(56)           References Cited

OTHER PUBLICATIONS

Intel Corp. "Mechanisms to Improve Reliability of NR MBS" 3GPP TSG RAN WG1 #103-e, e-Meeting, Oct. 26-Nov. 13, 2020, R1-2009001, 5 pages.
International Search Report and Written Opinion for PCT/CN2021/071494, filed Jan. 13, 2021, Report dated Oct. 18, 2021, 9 pages.
Moderator Huawei, "FL summary on improving reliability for MBS for RRC_CONNECTED UEs" 3GPP TSG RAN WG1 Agenda Item: 8.12.2 Meeting #103-e, R1-200xxxx, E-meeting, Oct. 26-Nov. 13, 2020, 19 pages.

* cited by examiner

200 transmitting, by a base station, a message to a terminal device configuring the terminal device to operate in a feedback mode
210 performing a transmission with the terminal device according to the feedback mode
220

250 receiving, by a terminal device, a message from
a base station configuring the terminal device
to operate in a feedback mode
260 performing a transmission with the base station
according to the feedback mode
270

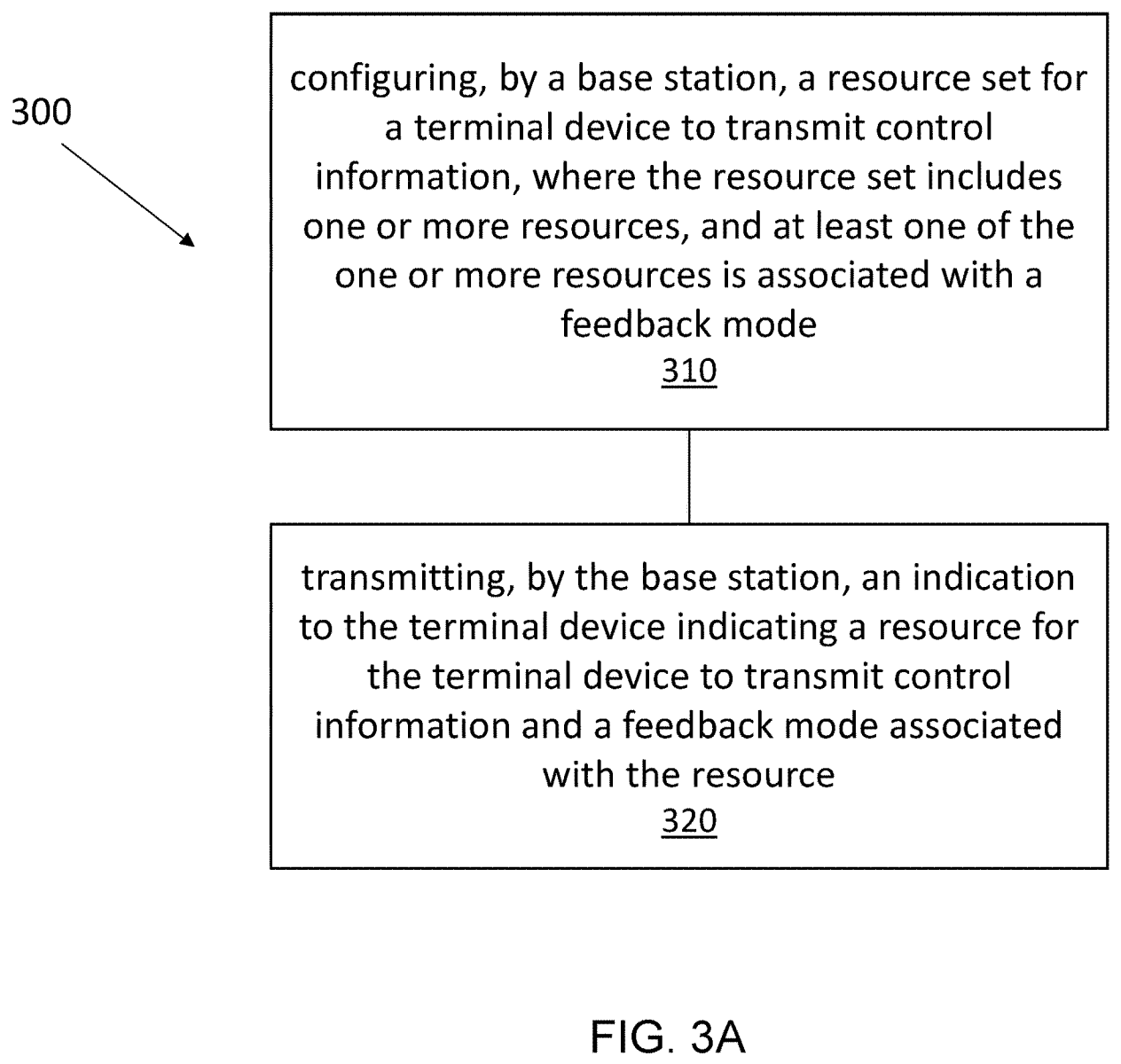

300 configuring, by a base station, a resource set for a terminal device to transmit control information, where the resource set includes one or more resources, and at least one of the one or more resources is associated with a feedback mode
310 transmitting, by the base station, an indication to the terminal device indicating a resource for the terminal device to transmit control information and a feedback mode associated with the resource
320

FIG. 3A

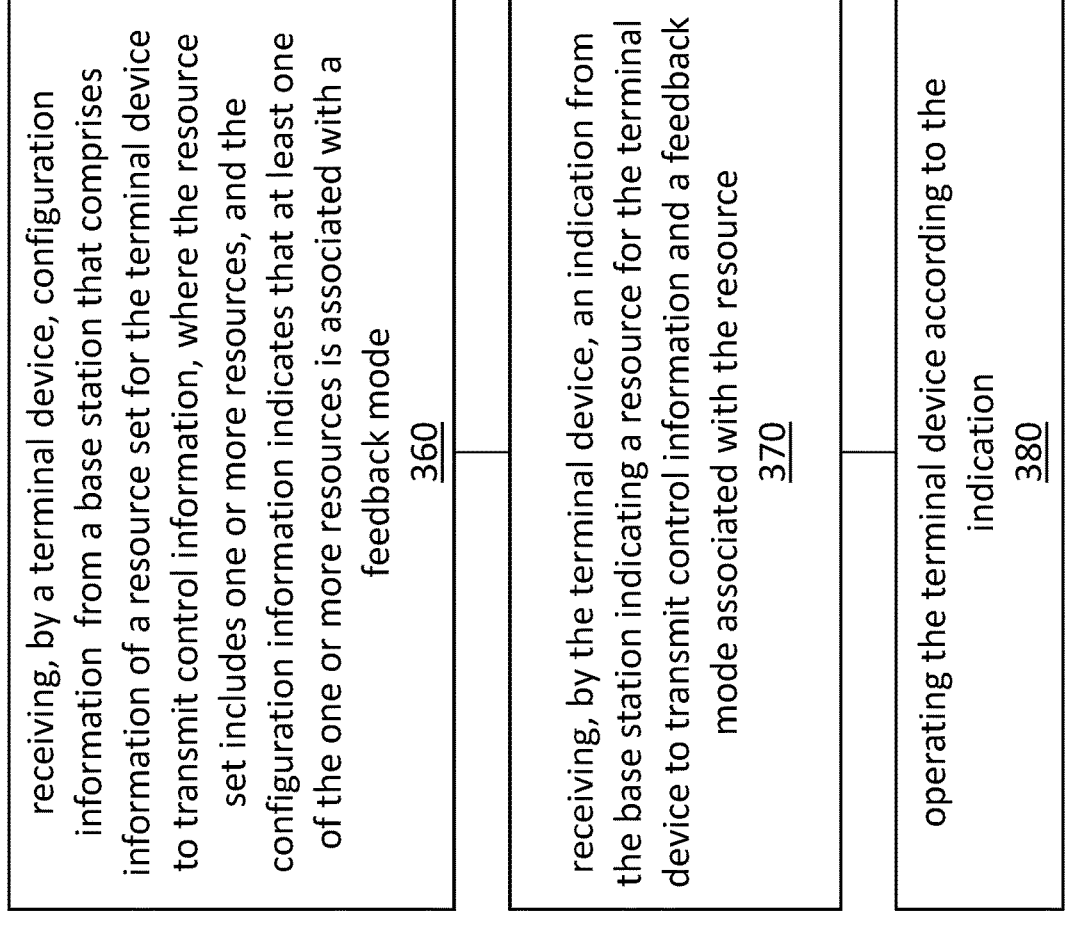

receiving, by a terminal device, configuration information from a base station that comprises information of a resource set for the terminal device to transmit control information, where the resource set includes one or more resources, and the configuration information indicates that at least one of the one or more resources is associated with a feedback mode
360 receiving, by the terminal device, an indication from the base station indicating a resource for the terminal device to transmit control information and a feedback mode associated with the resource
370 operating the terminal device according to the indication
380

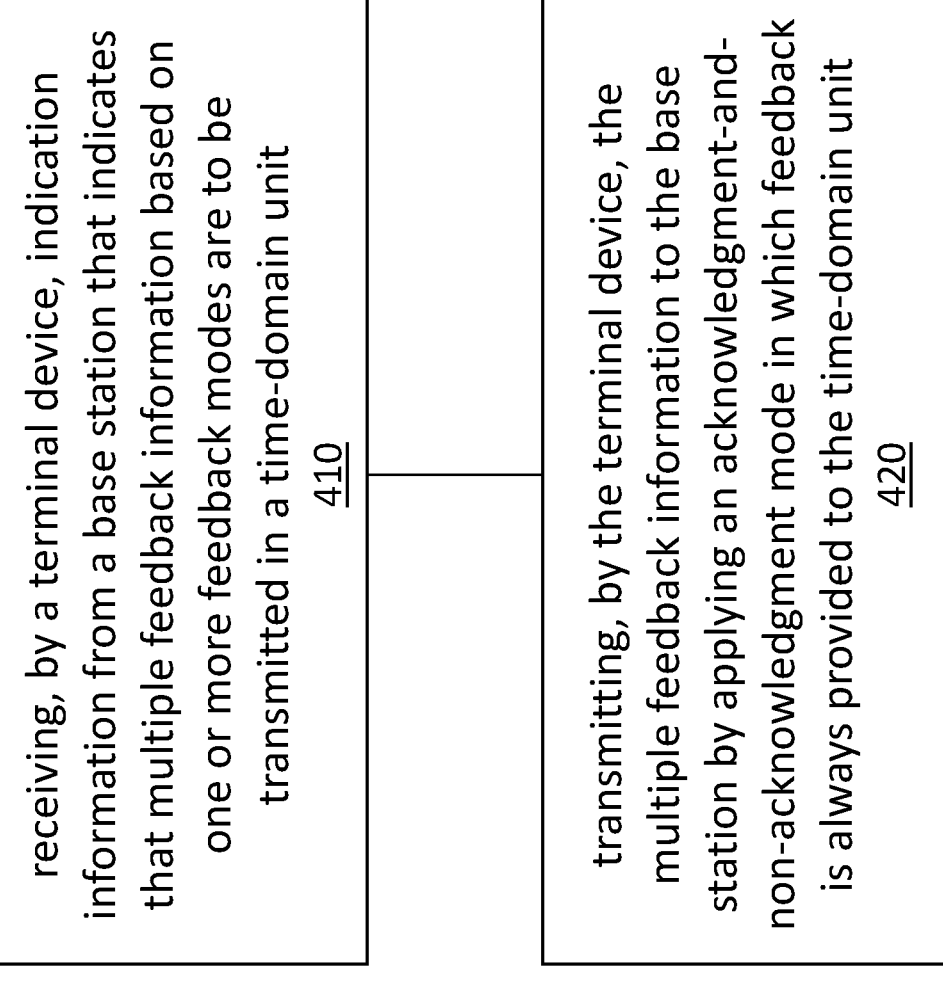

400 receiving, by a terminal device, indication information from a base station that indicates that multiple feedback information based on one or more feedback modes are to be transmitted in a time-domain unit
410 transmitting, by the terminal device, the multiple feedback information to the base station by applying an acknowledgment-and-non-acknowledgment mode in which feedback is always provided to the time-domain unit
420

FIG. 4A

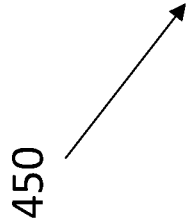

transmitting, by a base station, indication information to a terminal device that indicates that multiple feedback information based on one or more feedback modes are to be transmitted in a time-domain unit

460 receiving, by the base station, the multiple feedback information from the terminal device in the time-domain unit using an acknowledgment-and-non-acknowledgment mode in which feedback is always provided

DYNAMIC SIGNALING OF FEEDBACK MODES

CROSS-REFERENCE TO RELATED APPLICATION

This application is a continuation and claims priority to International Application No. PCT/CN2021/071494, filed on Jan. 13, 2021, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable dynamic signaling of various feedback modes, thereby facilitating appropriate feedback reporting based on the application scenarios.

In one example aspect, a method for wireless communication includes transmitting, by a base station, a message to a terminal device configuring the terminal device to operate in a feedback mode and performing a transmission with the terminal device according to the feedback mode.

In another example aspect, a method for wireless communication includes receiving, by a terminal device, a message from a base station configuring the terminal device to operate in a feedback mode and performing a transmission with the base station according to the feedback mode.

In another example aspect, a method for wireless communication includes configuring, by a base station, a resource set for a terminal device to transmit control information, wherein the resource set includes one or more resources. At least one of the one or more resources is associated with a feedback mode. The method also includes transmitting, by the base station, an indication to the terminal device indicating a resource for the terminal device to transmit control information and a feedback mode associated with the resource.

In another example aspect, a method for wireless communication includes receiving, by a terminal device, configuration information from a base station. The configuration information comprises information of a resource set for the terminal device to transmit control information. The resource set includes one or more resources and the configuration information indicates that at least one of the one or more resources is associated with a feedback mode. The method includes receiving, by the terminal device, an indication from the base station indicating a resource for the terminal device to transmit control information and a feedback mode associated with the resource and operating the terminal device according to the indication.

In another example aspect, a method for wireless communication includes receiving, by a terminal device, indication information from a base station. The indication information indicates that multiple feedback information based on multiple feedback modes are to be transmitted in a time-domain unit. The method also includes transmitting, by the terminal device, the multiple feedback information to the base station by applying an acknowledgment-and-non-acknowledgment mode in which feedback is always provided to the time-domain unit.

In another example aspect, a method for wireless communication includes transmitting, by a base station, indication information to a terminal device. The indication information indicates that multiple feedback information based on multiple feedback modes are to be transmitted in a time-domain unit. The method also includes receiving, by the base station, the multiple feedback information from the terminal device in the time-domain unit using an acknowledgment-and-non-acknowledgment mode in which feedback is always provided.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 3A is a flowchart representation of another method for wireless communication in accordance with the present technology.

FIG. 3B is a flowchart representation of another method for wireless communication in accordance with the present technology.

FIG. 4A is a flowchart representation of another method for wireless communication in accordance with the present technology.

FIG. 4B is a flowchart representation of another method for wireless communication in accordance with the present technology.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1:
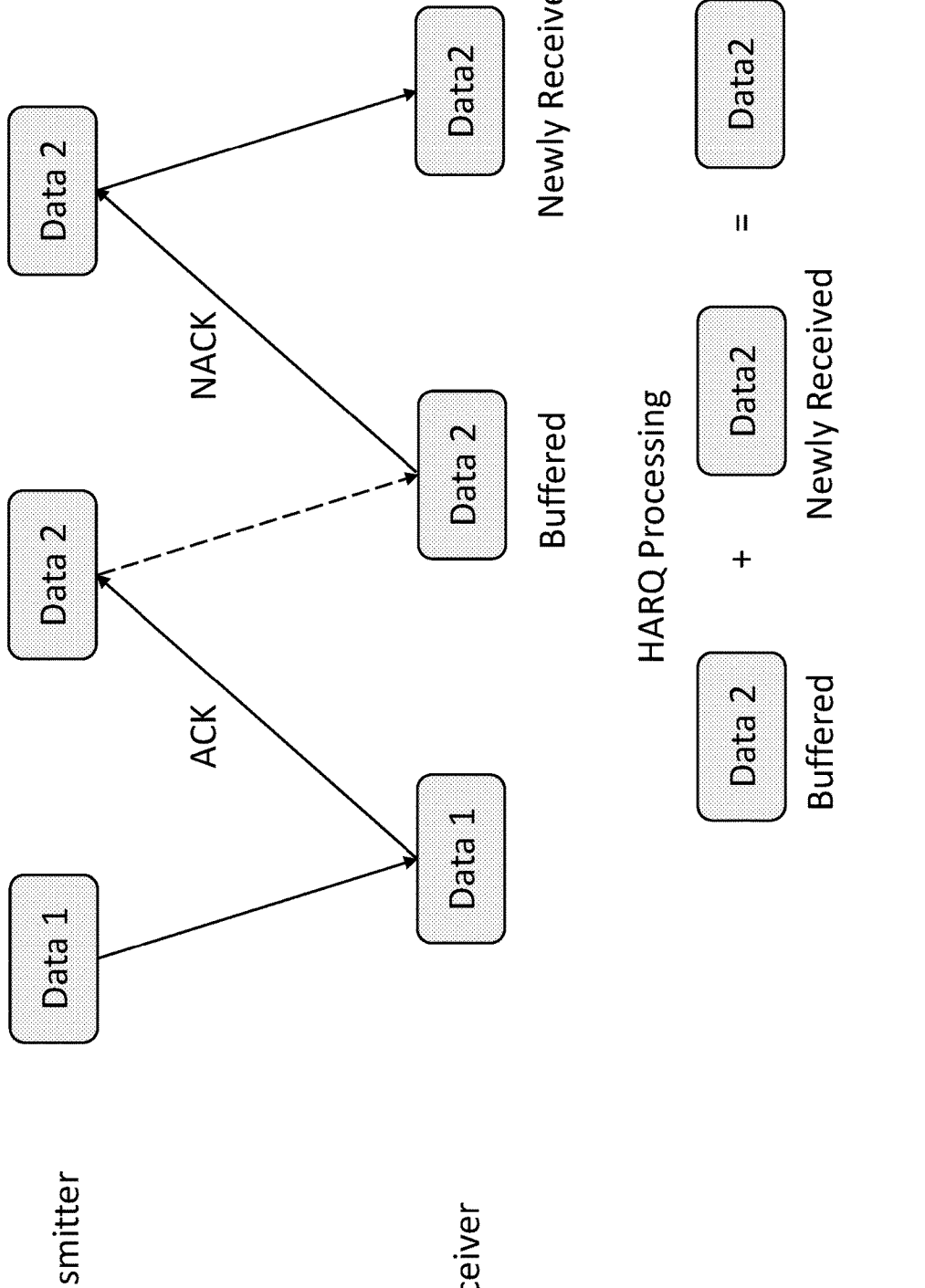
FIG. 1 illustrates an example Hybrid Automatic Repeat Request (HARQ) feedback mechanism.

In current 5G communication systems, the terminal devices provide feedback information to the base stations to facilitate scheduling of subsequent transmissions. For example, as shown in FIG. 1, Hybrid Automatic Repeat Request (HARQ) Acknowledgement (ACK) and Non-Acknowledgement (NACK) feedback is provided using the HARQ-ACK feedback mode to facilitate the high-rate forward error correction (FEC) and automatic repeat request (ARQ) error-control. In the HARQ-ACK mode, the ACK and NACK feedback is always provided. With the advancement of the wireless technology, additional feedback modes are introduced. Example HARQ feedback modes are described below:

(1) HARQ-ACK feedback mode: Regardless of whether the transmission is received successfully, feedback (ACK and NACK) is always provided.

(2) NACK-only feedback mode: Feedback is provided only when the reception fails (NACK).

(3) ACK-only feedback mode: Feedback is provided only when the reception succeeds (ACK).

(4) Disabled feedback mode: Feedback is disabled regardless of whether the data reception fails or succeeds.

Each of the example feedback modes above is considered to have its own applicable scenarios. For example, the classic feedback mode—HARQ-ACK feedback mode—is suitable for conventional services. For high-reliability services, NACK-only feedback is provided to reduce feedback signaling overhead. For semi-statically configured transmissions with small transmission periods, the ACK-only feedback mode is more advantageous for reducing feedback signaling overhead. The disabled feedback mode is suitable for an ideal channel environment, and the base station can stop UE feedback for a short period of time, thereby saving feedback overhead.

As the network conditions and transmission types change, it is necessary to update the feedback modes accordingly. This patent document discloses techniques that can be implemented in various embodiments to dynamically signal and update the feedback mode, thereby ensuring that the base stations can get appropriate feedback without incurring necessary signaling overhead.

Figure 2A:
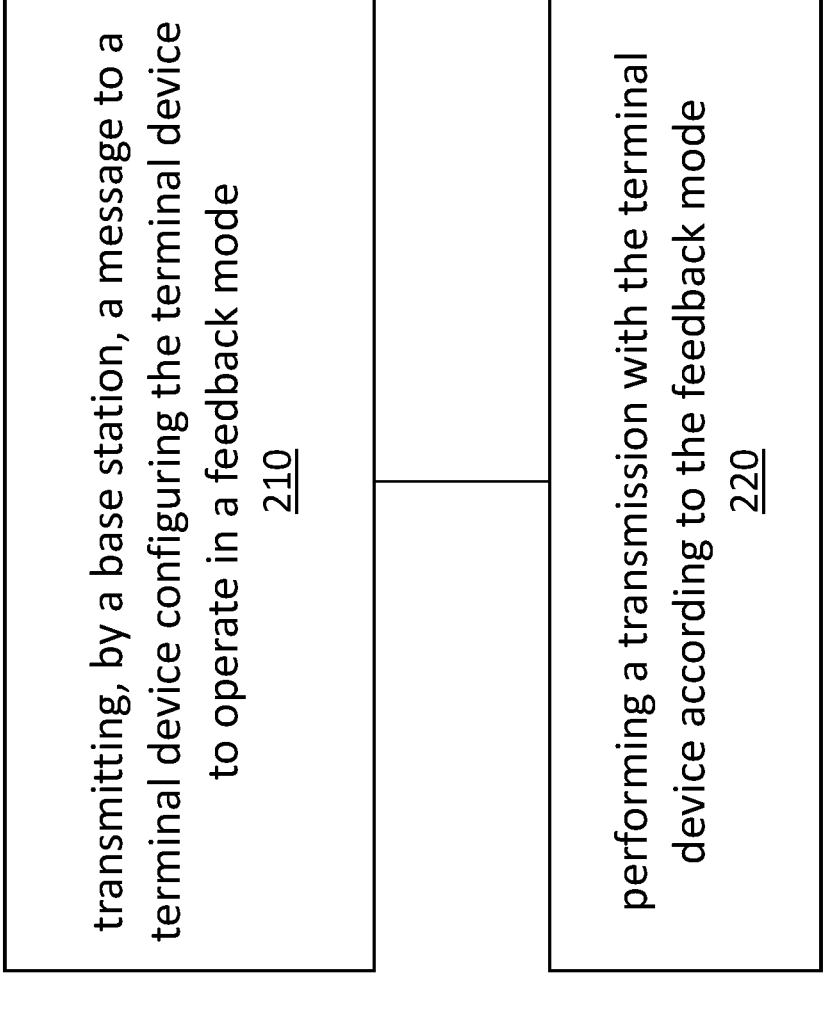
FIG. 2A is a flowchart representation of a method for wireless communication in accordance with the present technology.

FIG. 2A is a flowchart representation of a method 200 for wireless communication in accordance with the present technology. The method 200 includes, at operation 210, transmitting, by a base station, a message to a terminal device configuring the terminal device to operate in a feedback mode. The method 200 also includes, at operation 220, performing a transmission with the terminal device according to the feedback mode.

Figure 2B:
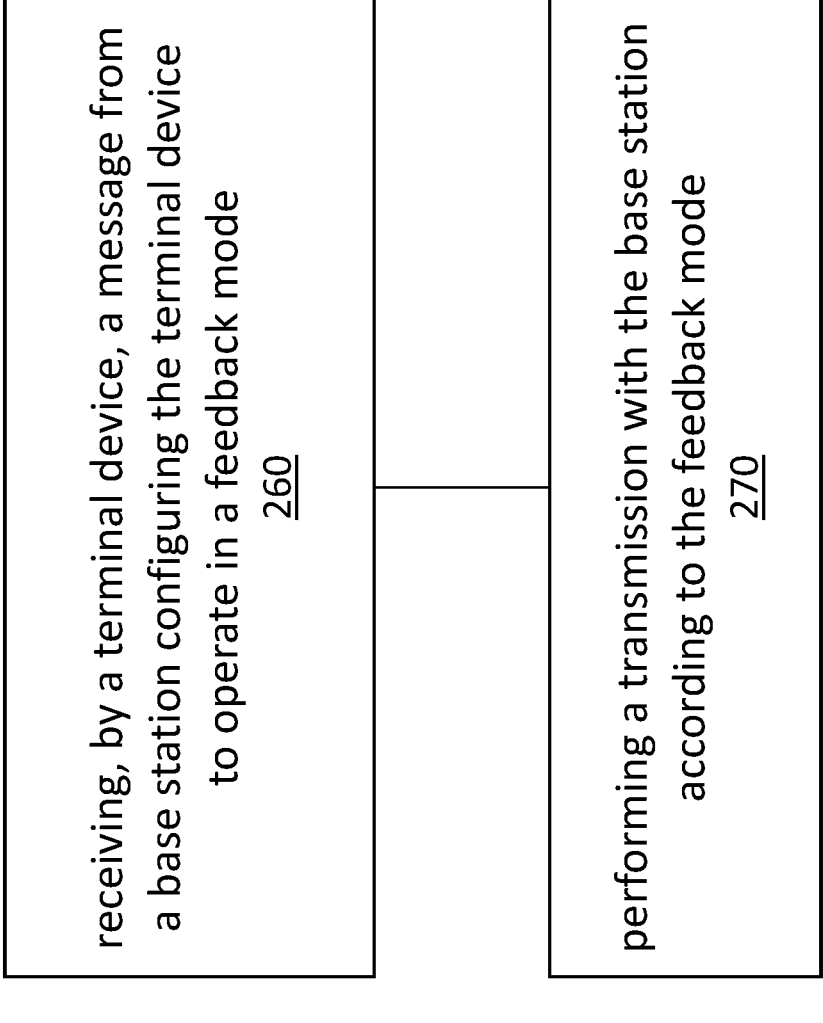
FIG. 2B is a flowchart representation of another method for wireless communication in accordance with the present technology.

FIG. 2B is a flowchart representation of a method for wireless communication in accordance with the present technology. The method 250 includes, at operation 260, receiving, by a terminal device, a message from a base station configuring the terminal device to operate in a feedback mode. The method 250 also includes, at operation 270, performing a transmission with the base station according to the feedback mode.

In some embodiments, the feedback mode comprises an acknowledgment-and-non-acknowledgment mode in which feedback is always provided, a non-acknowledgment-only mode in which feedback is only provided when a transmission is unsuccessful or undetected, an acknowledgment-only mode in which feedback is only provided when a transmission is successful, or a disable mode in which feedback is disabled. In some embodiments, the message comprises a Radio Resource Configuration (RRC) signaling message. In some embodiments, the message is transmitted on a multicast control channel. In some embodiments, the message comprises one or more feedback modes configured for a Semi-Persistent Scheduling configuration.

In some embodiments, the message comprises a Downlink Control Information (DCI) message that includes one or more fields indicating the feedback mode. In some embodiments, a resource for the terminal device to transmit control information to the base station is specified in the message. The resource is associated with the feedback mode. In some embodiments, the resource is specified using a Physical Uplink Control Channel (PUCCH) Resource Indicator in the DCI message. In some embodiments, a default feedback mode is used as the feedback mode in case the resource is not configured with a corresponding feedback mode.

FIG. 3A is a flowchart representation of a method for wireless communication. The method 300 includes, at operation 310, configuring, by a base station, a resource set for a terminal device to transmit control information. The resource set includes one or more resources. At least one of the one or more resources is associated with a feedback mode. The method 300 also includes, at operation 320, transmitting, by the base station, an indication to the terminal device indicating a resource for the terminal device to transmit control information and a feedback mode associated with the resource.

FIG. 3B is a flowchart representation of a method for wireless communication. The method 350 includes, at operation 360, receiving, by a terminal device, configuration information from a base station. The configuration information comprises information of a resource set for the terminal device to transmit control information. The resource set includes one or more resources, and the configuration information indicates that at least one of the one or more resources is associated with a feedback mode. The method 350 includes, at operation 370, receiving, by the terminal device, an indication from the base station indicating a resource for the terminal device to transmit control information and a feedback mode associated with the resource. The method 350 also includes, at operation 380, operating the terminal device according to the indication.

In some embodiments, the feedback mode comprises an acknowledgment-and-non-acknowledgment mode in which feedback is always provided, a non-acknowledgment-only mode in which feedback is only provided when a transmission is unsuccessful or undetected, an acknowledgment-only mode in which feedback is only provided when a transmission is successful, or a disable mode in which feedback is disabled. In some embodiments, the one or more resources in the resource set are associated with different feedback modes. In some embodiments, a default feedback mode is considered to be associated with a resource in the resource set in case the configuration information fails to indicate a feedback mode associated with the resource. In some embodiments, the configuration information is carried in a Physical Uplink Control Channel (PUCCH)-config message or a Semi-Persistent Scheduling (SPS)-PUCCH-AN-List-r16 message. In some embodiments, the indication is carried in a Downlink Control Information (DCI) message.

FIG. 4A is a flowchart representation of a method for wireless communication. The method 400 includes, at operation 410, receiving, by a terminal device, indication information from a base station. The indication information indicates that multiple feedback information based on one or more feedback modes are to be transmitted in a time-domain unit. The method 400 includes, at operation 420, transmitting, by the terminal device, the multiple feedback information to the base station by applying an acknowledgment-and-non-acknowledgment mode in which feedback is always provided to the time-domain unit.

FIG. 4B is a flowchart representation of a method for wireless communication. The method 450 includes, at operation 460, transmitting, by a base station, indication information to a terminal device. The indication information indicates that multiple feedback information based on one or more feedback modes are to be transmitted in a time-domain unit. The method 450 also includes, at operation 470, receiving, by the base station, the multiple feedback information from the terminal device in the time-domain unit using an acknowledgment-and-non-acknowledgment mode in which feedback is always provided.

In some embodiments, the time-domain unit comprises a slot or a subslot. In some embodiments, the one or more feedback modes comprise at least a non-acknowledgment-only mode in which feedback is only provided when a transmission is unsuccessful or undetected, an acknowledgment-only mode in which feedback is only provided when a transmission is successful, or the acknowledgment-and-non-acknowledgment mode.

In some embodiments, the multiple feedback information is determined based on the one or more feedback modes. In some embodiments, the multiple feedback information comprises at least one of: multiple feedback information based on one or more non-acknowledgment-only modes, multiple feedback information based on one or more acknowledgment-only modes, or multiple feedback information based on different types of feedback modes. In some embodiments, the multiple feedback information based on the one or more feedback modes comprise Physical Uplink Control Channel information corresponding to the multiple feedback information overlapping each other in the time-domain unit.

Some examples of the disclosed techniques are further described in the following example embodiments.

Embodiment 1

In some embodiments, the base station can send a message to a terminal device configuring the terminal device to operate in a feedback mode. The message can be a DCI message transmitted on a control channel. For example, existing parameter field(s) in the DCI message can be reinterpreted to indicate the feedback mode. Alternatively, or in addition, one or more new parameter fields can be added to the DCI message to indicate the feedback mode. The User Equipment (UE) that receives the DCI message can determine the feedback mode according to the value(s) of the parameter field(s).

If existing parameter field(s) in the DCI message are used to indicate the feedback mode, a combination of the parameter field values can be used to determine the feedback mode. For example, one or more of the following parameter fields in DCI can be interpreted at the same time or be combined for the feedback mode indication.

Frequency domain resource assignment
Time domain resource assignment
HARQ process number
Downlink assignment index
The Physical Uplink Control Channel (PUCCH) resource indicator
The Physical Downlink Shared Channel (PDSCH)-to-HARQ feedback timing indicator
PUCCH resource indicator (PRI)

In some embodiments, one or more bits in a parameter field can be used to indicate the feedback mode. For example, a number of highest or lowest bits in a parameter field can be used. In some embodiments, a default or a preset feedback mode (e.g., the HARQ-ACK feedback mode) can be used if the message does not carry relevant information to indicate the feedback mode. For example, a NULL parameter field (e.g., a parameter field that is configured as having zero bit) can be associated with the default or the preset feedback mode.

Embodiment 2

In some embodiments, the base station can use a Radio Resource Configuration (RRC) message to configure and/or indicate the feedback mode. In some embodiments, the base station can use a Media Access Control (MAC) Control Element (CE) message to configure and/or indicate the feedback mode. In some embodiments, for a Multicast and Broadcast Service (MBS), the feedback mode can be configured by a message carried on a Multicast Control Channel (MCCH). When the UE receives the MBS transmission, the UE provides feedback according to the feedback mode configured for the MBS service.

In some embodiments, for Semi-Persistent Scheduling (SPS), the feedback mode can be configured in the SPS configuration. For example, the feedback mode corresponding to each SPS configuration can be configured in SPS-Config. When the UE receives the SPS transmissions according to the SPS-Config signaling, the UE can also use the feedback mode corresponding to the SPS configuration.

In some embodiments, an RRC message can be used to configure multiple candidate feedback modes for the UE. For example, multiple candidate feedback modes can be configured for one SPS configuration in the SPS-Config signaling. The base station then subsequently sends a second message (e.g., a DCI message as described in Embodiment 1) to select a specific feedback mode from the candidate feedback modes.

Embodiment 3

In some embodiments, resources used for reporting uplink control information (e.g., the PUCCH resources) can be associated with corresponding feedback modes. The base station configures one or more PUCCH resources for the UE to perform uplink reporting. If a PUCCH resource is configured to be associated with a feedback mode, the UE can provide feedback using the corresponding feedback mode.

In some embodiments, different feedback modes can be configured for different PUCCH resources. In some embodiments, a default feedback mode (e.g., the HARQ-ACK feedback mode) is used if the PUCCH is not configured to be associated with any feedback mode(s).

In some embodiments, the UE can be configured with more than one candidate feedback modes, e.g., as discussed in Embodiment 2. For example, both the HARQ-ACK feedback mode and the NACK-only feedback mode are configured as candidate feedback modes. The UE then receives a PUCCH resource configuration indicating that the PUCCH resource is associated with the NACK-only feedback mode. For subsequent feedback reporting, the UE adopts the NACK-only feedback mode. If the PUCCH resource does not have an associated feedback mode, the HARQ-ACK feedback mode can be adopted instead.

Embodiment 4

In some embodiments, the base station can configure a resource set of resources for the UE to perform uplink reporting. The resource set can include one or more resources (e.g., one or more PUCCH resources). The PUCCH resources in the resource set can be associated with different feedback modes.

The current PUCCH resource selection mechanism can be reused to obtain a PUCCH resource. A corresponding feedback mode can also be determined upon the selection of the PUCCH resource. For example, the PUCCH resource indicator (PRI) field in the DCI message can be used to select a PUCCH resource from the PUCCH resource set. The UE can perform subsequent transmissions based on the PUCCH resource and/or the corresponding feedback mode.

For example, a resource set including Q PUCCH resources is configured, where Q is a positive integer. The Q PUCCH resources include a maximum number of M PUCCH resources that are associated with the HARQ-ACK feedback mode, and a maximum number of N PUCCH resources that are associated with the NACK-only feedback mode. Based on the configured PUCCH resource, the base station can flexibly switch between different feedback modes using signaling messages (e.g., the DCI signaling). To further reduce signaling overhead, if a PUCCH resource is not configured with a feedback mode, a default feedback mode is used for providing feedback.

As another example, multiple feedback modes (e.g., NACK only feedback mode, ACK only feedback mode, and HARQ-ACK feedback mode) can be the candidate feedback modes for an SPS configuration. The base station can configure a PUCCH resource set and include PUCCH resources associated with different feedback modes in the PUCCH resource set. The UE is then notified to select a PUCCH resource from the PUCCH resource set based on the PRI field in the DCI. The UE can use the feedback mode corresponding to the PUCCH resource for feedback reporting.

For MBS transmissions, the base station can use group-common control information that is common to a group of UEs to schedule MBS transmissions to multiple UEs. Alternatively, the base station can use UE-specific control information to schedule MBS transmissions to multiple UEs. The two scheduling methods have their own advantages and disadvantages. If the group-common control information is used, the NACK-only feedback mode is more advantageous as it reduces signaling overhead of acknowledgment from multiple UEs at the same time. The base station can use the PRI field in the DCI message carried on group-common PDCCH to indicate that the resource(s) are associated with the NACK-only feedback mode. If the UE-specific control information is used, the HARQ-ACK feedback mode is more suitable for individual UEs to provide complete feedback of the transmissions. The base station can use the PRI field in the DCI message carried on UE-specific PDCCH to indicate that the resource(s) are associated with the HARQ-ACK feedback mode.

In order to disable feedback reporting, the base station can indicate, e.g., via a DCI message, that the disabled feedback mode should be used. In some embodiments, a NULL PUCCH resource can be configured in a resource set. The NULL PUCCH resource is specifically associated with the disabled feedback mode. When the PRI field in the DCI message indicates a NULL PUCCH resource from the resource set, the UE can disable the feedback reporting for subsequent transmissions. Alternatively, or in addition, when the PRI field indicates a PUCCH resource that is not configured in the resource set, the unconfigured resource is associated the disabled feedback mode. For example, a 3-bit PRI field can indicate up to eight resources. A resource set is configured with only seven PUCCH resources corresponding to values 0 to 6. When the PRI field has a value of 7 corresponding to a resource that is not configured for the resource set, the UE can interpret the value of PRI field as the disabled feedback mode.

Embodiment 5

In some cases, the mixed use of different feedback modes and the semi-static or dynamic construction of the codebook or dynamic codebook mechanism can cause inconsistency between the base station and the UE. For example, the UE is configured with a semi-static codebook mechanism to construct a HARQ-ACK codebook. Then a NACK-only feedback mechanism is configured for the UE. When the base station schedules one or more PDSCH transmissions via DCI signaling (e.g., PDSCH1, PDSCH2, PDSCH3), it can be problematic when part of the NACK-only feedback information is multiplexed into the HARQ-ACK codebook because the UE and the base station can have inconsistent understanding of the size and location of the multiplexed feedback information. In a specific example, reception of PDSCH1 is unsuccessful while receptions of PDSCH2 and PDSCH3 are successful. Using the NACK-only feedback mode, the UE provides a 1-bit HARQ-ACK codebook with NACK for PDSCH1. However, the base station does not know which PDSCH has failed given the 1-bit HARQ-ACK codebook.

The problem discussed above can be addressed using at least one of the following methods.

Method 1: If the UE is configured with the NACK-only feedback mode or ACK-only feedback mode with semi-static codebook mechanism or the dynamic codebook mechanism, and if a HARQ-ACK codebook includes more than one NACK-only or ACK-only feedback information or includes multiple feedback information corresponding to different feedback modes (e.g., NACK-only, ACK-only or HARQ-ACK), the UE reverts back to the HARQ-ACK feedback mode for the HARQ-ACK codebook construction.

Method 2: If the UE is configured to report multiple feedback information corresponding to different feedback modes in the same time-domain, the UE reverts back to the HARQ-ACK feedback mode. For example, the UE is configured with the NACK-only (or ACK-only) feedback mode. The base station indicates that the UE should transmit multiple feedback for the NACK-only (or ACK-only) feedback mode in the same slot or sub-slot n, the UE reverts to HARQ-ACK feedback mode to constructs a HARQ-ACK codebook for all PDSCHs regardless of correct or incorrect receptions. As another example, the UE is configured with both the NACK-only feedback mode and the ACK-only feedback mode. The base station indicates that the UE should transmit one or more feedback for the NACK-only feedback mode and/or one or more feedback the ACK-only feedback mode in the same slot or sub-slot n, the UE reverts to HARQ-ACK feedback mode to constructs a HARQ-ACK codebook. As yet another example, the UE is configured with the NACK-only feedback mode or the ACK-only feedback mode. The base station indicates that the UE should transmit one or more feedback for the NACK-only feedback mode (and/or one or more feedback the ACK-only feedback mode) and one or more feedback for the HARQ-ACK feedback mode in the same slot or sub-slot n, the UE reverts to HARQ-ACK feedback mode to constructs a HARQ-ACK codebook. Because the multiple feedback carried on the PUCCH overlaps in the time domain (e.g., in the same time domain unit), the UE reverts to HARQ-ACK feedback mode to constructs a HARQ-ACK codebook for all PDSCHs.

Embodiment 6

Currently, one type of the HARQ-ACK codebooks is referred to as type3 codebook, as defined in 3GPP TS 38.213. The construction of the type3 codebook requires un-transmitted feedback information in all HARQ processes. Therefore, the type3 codebook can introduce a large signaling overhead as the codebook needs to be filled with information (necessary or unnecessary) from all HARQ processes, even when feedback mechanism is disabled or not needed. The same signaling overhead problem also exists from type1 codebook (defined in 3GPP TS 38.213). This problem can be addressed using at least one of the following methods.

Method 1:

When type3 or type1 codebook construction is triggered, the construction of the codebook does not include any feedback information for one or more of the following types of transmissions:

1. PDSCH transmissions with feedback reporting disabled;
2. SPS configurations with feedback reporting disabled;
3. MBS services with feedback reporting disabled; or
4. MBS services do not require feedback information.

That is, there is no need to fill in unnecessary information in the codebook when feedback reporting is disabled or not required, thereby reducing signaling overhead for type3 or type1 codebook.

Method 2:

Alternatively, or in addition, the type3 or type1 codebook is constructed based on the indices of active SPS configurations, rather than all of the HARQ processes. For example, four SPS configurations are configured for the UE, with indices SPS0, SPS1, SPS2, and SPS3. The SPS2 configuration is disabled for feedback reporting. When the codebook construction is triggered, the UE constructs the codebook according to the indices of enabled SPS configurations in an order (e.g., an ascending order). For example, the construction can start from SPS0, followed by SPS1 and SPS3. The HARQ-ACKs of the SPS configurations are then concatenated to form the codebook. Therefore, only feedback information from enabled SPS configuration is reported, thereby reducing signaling overhead of the codebook.

Method 3:

For MBS transmissions, the construction of the type3 or type1 codebook only includes the un-transmitted HARQ-ACK information that meets one of the following conditions:

1. Only the HARQ-ACK information for one or more MBSs indicated in the DCI.
2. Only the HARQ-ACK information of the MBS corresponding to the RNTI corresponding to the DCI.
3. The HARQ-ACK information for all MBS received by the UE.
4. The HARQ-ACK information for all MBS received by the UE excluding the MBS that with feedback reporting disabled.

This way, only a subset feedback information is included in the codebook, thereby reducing the signaling overhead.

Figure 5:
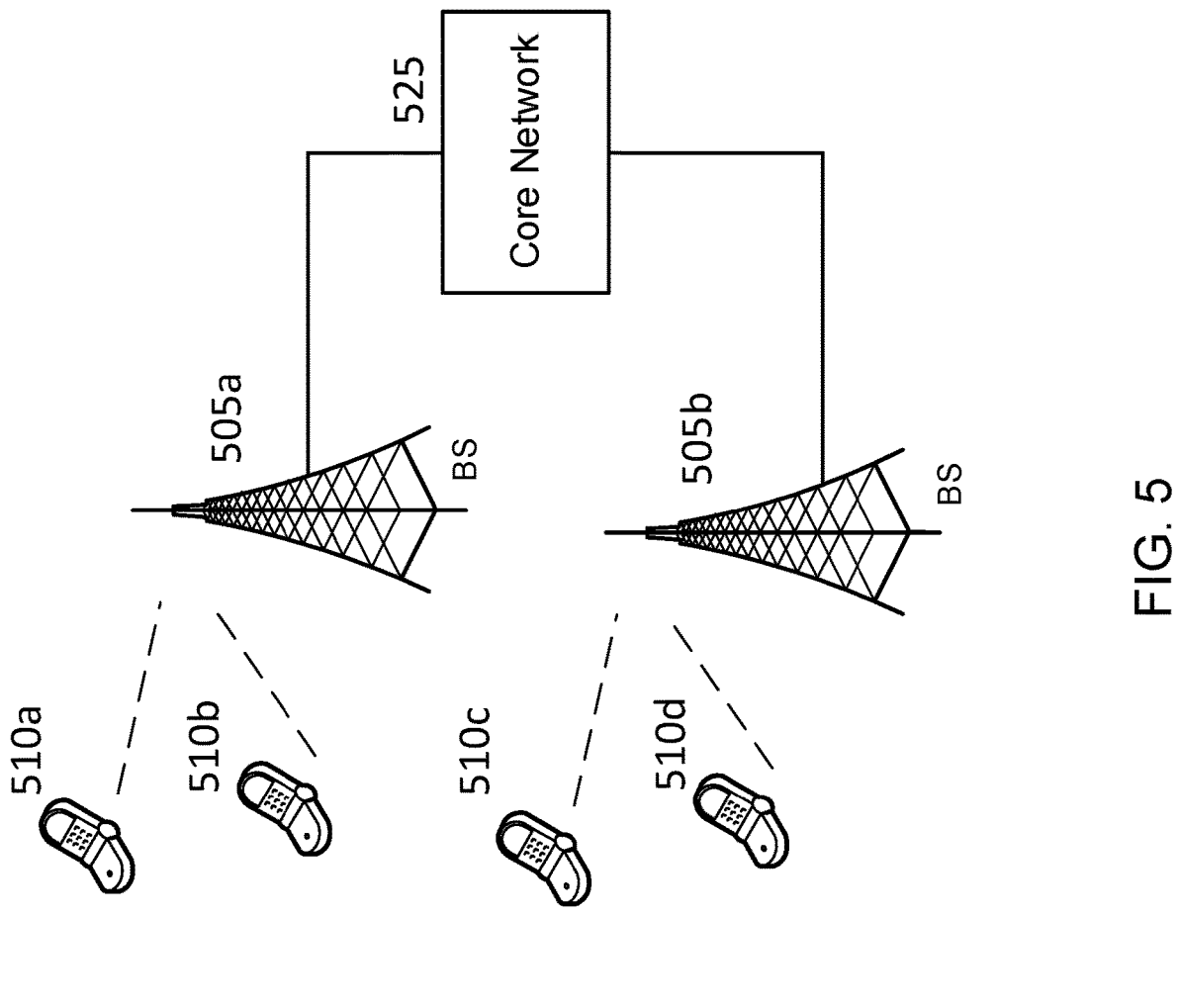
FIG. 5 shows an example of a wireless communication system where techniques in accordance with one or more embodiments of the present technology can be applied.

FIG. 5 shows an example of a wireless communication system 500 where techniques in accordance with one or more embodiments of the present technology can be applied. A wireless communication system 500 can include one or more base stations (BSs) 505a, 505b, one or more wireless devices 510a, 510b, 510c, 510d, and a core network 525. A base station 505a, 505b can provide wireless service to wireless devices 510a, 510b, 510c and 510d in one or more wireless sectors. In some implementations, a base station 505a, 505b includes directional antennas to produce two or more directional beams to provide wireless coverage in different sectors.

The core network 525 can communicate with one or more base stations 505a, 505b. The core network 525 provides connectivity with other wireless communication systems and wired communication systems. The core network may include one or more service subscription databases to store information related to the subscribed wireless devices 510a, 510b, 510c, and 510d. A first base station 505a can provide wireless service based on a first radio access technology, whereas a second base station 505b can provide wireless service based on a second radio access technology. The base stations 505a and 505b may be co-located or may be separately installed in the field according to the deployment scenario. The wireless devices 510a, 510b, 510c, and 510d can support multiple different radio access technologies. The techniques and embodiments described in the present document may be implemented by the base stations of wireless devices described in the present document.

Figure 6:
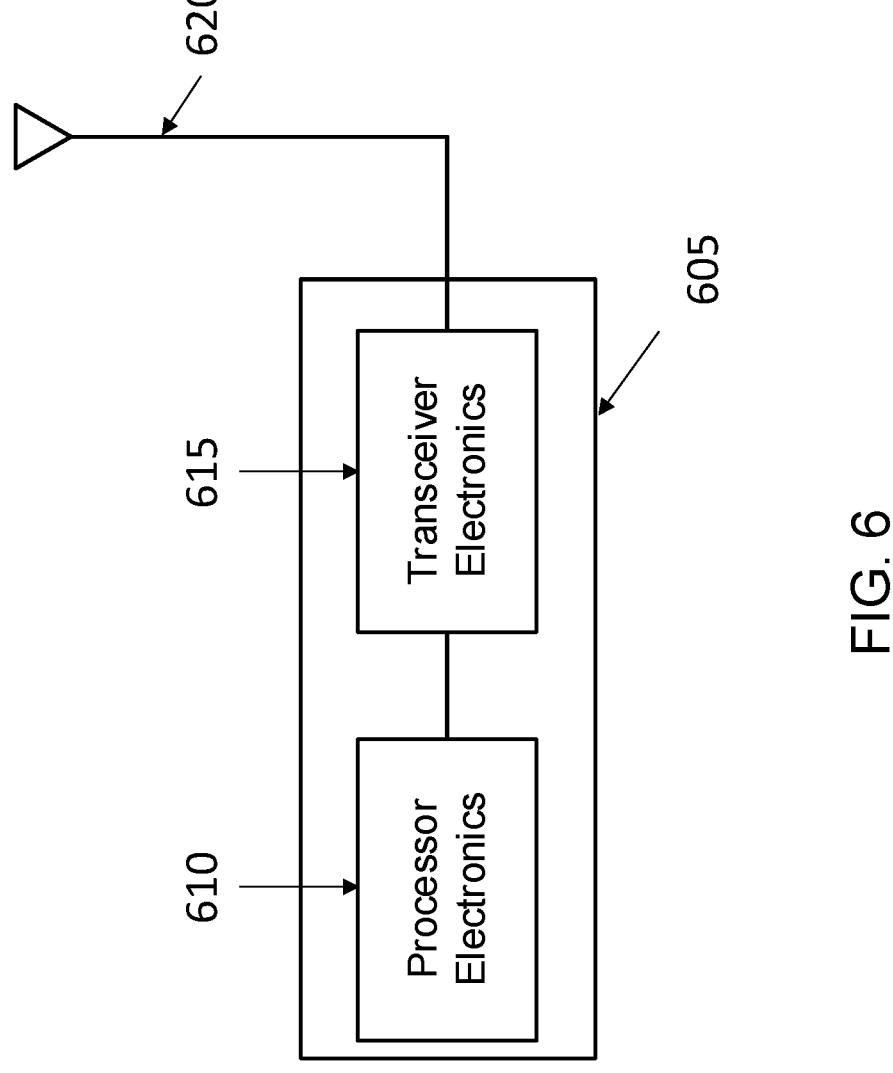
FIG. 6 is a block diagram representation of a portion of a radio station in accordance with one or more embodiments of the present technology can be applied.

FIG. 6 is a block diagram representation of a portion of a radio station in accordance with one or more embodiments of the present technology can be applied. A radio station 605 such as a base station or a terminal device (or a wireless device) can include processor electronics 610 such as a microprocessor that implements one or more of the wireless techniques presented in this document. The radio station 605 can include transceiver electronics 615 to send and/or receive wireless signals over one or more communication interfaces such as antenna 620. The radio station 605 can include other communication interfaces for transmitting and receiving data. Radio station 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the radio station 605. In some embodiments, the radio station 605 may be configured to perform the methods described herein.

It will be appreciated that the present document discloses techniques that can be embodied in various embodiments to signal and invoke appropriate feedback reporting while reducing reporting overhead. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a terminal device, a Radio Resource Configuration (RRC) message from a base station, wherein the RRC message indicates a feedback mode of Hybrid Automatic Repeat Request Acknowledgment (HARQ-ACK) information for a Multicast and Broadcast Service (MBS), and wherein the RRC message indicates a first feedback mode in which both acknowledgement (ACK) and non-acknowledgement (NACK) are provided or a second feedback mode in which only NACK is provided is applicable to the MBS; and
   reporting, by the terminal device, feedback information obtained by multiplexing a second feedback information according to the second feedback mode with a first feedback information according to the first feedback mode to the base station;
   wherein in response to the multiplexing, the second feedback information is provided according to the first feedback mode.

2. The method of claim 1, wherein the RRC message further comprises information that enables a dynamic signaling of HARQ-ACK information for an MBS, and the method further comprises:
   receiving, by the terminal device, a Downlink Control Information (DCI) message from the base station, wherein the DCI message selectively includes a parameter field for the dynamic signaling of the HARQ-ACK information for the MBS in response to the information included in the RRC message.

3. The method of claim 1, wherein when the terminal device is configured with the second feedback mode, the method further comprising:
   in response to determining, by the terminal device, multiple information bits for reporting of feedback information according to the second feedback mode, reverting, by the terminal device, to the first feedback mode to report the multiple information bits.

4. A method for wireless communication, comprising:
   transmitting, by a base station, a Radio Resource Configuration (RRC) message to a terminal device, wherein the RRC message indicates a feedback mode of Hybrid Automatic Repeat Request Acknowledgment (HARQ-ACK) information for a Multicast and Broadcast Service (MBS), and wherein the RRC message indicates whether a first feedback mode in which both acknowledgement (ACK) and non-acknowledgement (NACK) are provided or a second feedback mode in which only NACK is provided is applicable to the MBS; and receiving, by the base station, feedback information obtained by multiplexing a second feedback information according to the second feedback mode with a first feedback information according to the first feedback mode from the terminal device, and wherein in response to the multiplexing, the second feedback information is provided according to the first feedback mode.

5. The method of claim 4, wherein the RRC message further comprises information that enables a dynamic signaling of HARQ-ACK information for an MBS, and the method further comprises:

transmitting, by the base station, a Downlink Control Information (DCI) message to the terminal device, wherein the DCI message selectively includes a parameter field for the dynamic signaling of the HARQ-ACK information for the MBS in response to the information included in the RRC message.

6. The method of claim 4, comprising:

receiving, by the base station, multiple information bits from the terminal device according to the first feedback mode upon the multiple information bits being configured according to the second feedback mode.

7. The method of claim 4, comprising:

receiving, by the base station, the multiplexed feedback information from the terminal device determined by multiplexing second feedback information according to the second feedback mode with first feedback information according to the first feedback mode, wherein the second feedback information from the terminal device is received according to the first feedback mode after the second feedback information is configured according to the second feedback mode.

8. A device for wireless communication, comprising one or more processors that are configured to:

receive a Radio Resource Configuration (RRC) message from a base station, wherein the RRC message indicates a feedback mode of Hybrid Automatic Repeat Request Acknowledgment (HARQ-ACK) information for a Multicast and Broadcast Service (MBS), and wherein the RRC message indicates a first feedback mode in which both acknowledgement (ACK) and non-acknowledgement (NACK) are provided or a second feedback mode in which only NACK is provided is applicable to the MBS; and report feedback information obtained by multiplexing a second feedback information according to the second feedback mode with a first feedback information according to the first feedback mode to the base station, wherein in response to the multiplexing, the second feedback information is provided according to the first feedback mode.

9. The device of claim 8, wherein the RRC message further comprises information that enables a dynamic signaling of HARQ-ACK information for an MBS, and wherein the one or more processors are configured to:

receive a Downlink Control Information (DCI) message from the base station, wherein the DCI message selectively includes a parameter field for the dynamic signaling of the HARQ-ACK information for the MBS in response to the information included in the RRC message.

10. The device of claim 8, wherein when the device is configured with the second feedback mode, and wherein the one or more processors are configured to:

in response to determine multiple information bits for reporting of feedback information according to the second feedback mode, revert to the first feedback mode to report the multiple information bits.

11. A device for wireless communication, comprising one or more processors that are configured to:

transmit a Radio Resource Configuration (RRC) message to a terminal device, wherein the RRC message indicates a feedback mode of Hybrid Automatic Repeat Request Acknowledgment (HARQ-ACK) information for a Multicast and Broadcast Service (MBS), and wherein the RRC message indicates a first feedback mode in which both acknowledgement (ACK) and non-acknowledgement (NACK) are provided or a second feedback mode in which only NACK is provided is applicable to the MBS; and receive feedback information obtained by multiplexing a second feedback information according to the second feedback mode with a first feedback information according to the first feedback mode from the terminal device, and wherein in response to the multiplexing, the second feedback information is provided according to the first feedback mode.

12. The device of claim 11, wherein the RRC message further comprises information that enables a dynamic signaling of HARQ-ACK information for an MBS, and wherein the one or more processors are configured to:

transmit a Downlink Control Information (DCI) message to the terminal device, wherein the DCI message selectively includes a parameter field for the dynamic signaling of the HARQ-ACK information for the MBS in response to the information included in the RRC message.

13. The device of claim 11, wherein the one or more processors are configured to:

receive multiple information bits from the terminal device according to the first feedback mode upon the multiple information bits being configured according to the second feedback mode.

14. The device of claim 11, wherein the one or more processors are configured to:

receive the multiplexed feedback information from the terminal device determined by multiplexing second feedback information according to the second feedback mode with first feedback information according to the first feedback mode in time domain, wherein the second feedback information from the terminal device is received according to the first feedback mode after the second feedback information is configured according to the second feedback mode.

* * * * *